US006296907B1

(12) United States Patent
Viksne

(10) Patent No.: US 6,296,907 B1
(45) Date of Patent: Oct. 2, 2001

(54) COATING FOR SILICONE GASKETS TO REDUCE COEFFICIENT OF FRICTION

(75) Inventor: George J. Viksne, Gulf Breeze, FL (US)

(73) Assignee: Wacker Silicones Corporation, Adrian, MI (US)

( * ) Notice: Subject to any disclaimer, the term of this patent is extended or adjusted under 35 U.S.C. 154(b) by 731 days.

(21) Appl. No.: 08/656,681

(22) Filed: May 31, 1996

(51) Int. Cl.[7] .................................................... B05D 3/02
(52) U.S. Cl. .................................... 427/387; 427/393.5
(58) Field of Search ................................ 427/387, 393.5

(56) References Cited

U.S. PATENT DOCUMENTS 4,223,897 9/1980 Staah et al. .
4,256,806 * 3/1981 Snyderd ................................ 428/378
4,404,348 * 9/1983 Fau et al. ................................ 528/15
4,562,096 * 12/1985 Lo et al. ........................... 427/208.8
5,080,973 1/1992 Nguyen .
5,368,315 11/1994 Viksne .
5,399,650 * 3/1995 Bilgrien ................................ 528/15
5,468,815 11/1995 Boardman et al. .

FOREIGN PATENT DOCUMENTS

612811 * 8/1994 (EP) .

* cited by examiner

*Primary Examiner*—Erma Cameron
(74) *Attorney, Agent, or Firm*—Brooks & Kushman P.C.

(57) ABSTRACT

The present invention relates to a method of reducing the coefficient of friction of gaskets. The method comprises coating the gasket with a curable silicone composition. The composition contains a curable silicone resin, a catalyst, at least one lubricating filler not soluble in the coating composition and optionally a solvent.

7 Claims, No Drawings

COATING FOR SILICONE GASKETS TO REDUCE COEFFICIENT OF FRICTION

FIELD OF INVENTION

The invention relates to a curable silicone composition, which when applied to a gasket and cured, reduces the coefficient of friction of the gasket.

BACKGROUND OF INVENTION

Gaskets are used to provide a seal between two engaging surfaces. For example gaskets are used in window assemblies to provide a seal against external air infiltration and water leakage. In a typical window assembly, in order to provide a tight seal, the gasket material must be somewhat resilient and able to conform to any irregularities between the mating surfaces of the window glass and a structural component such as a window frame. In applications where an engaging surface such as the glass slides across a face of a gasket generating lateral forces, the gasket must also provide resistance to tearing. Examples of applications where the gasket must resist tearing due to sliding or lateral movement of an engaging surface include sliding glass doors and automotive sunroofs. Typically, gaskets are prepared from elastomeric materials including natural or organic and synthetic rubbers, such as EPDM, SBR, butyl, nitrile and neoprene, chlorosulfonated polyethylene, fluorocarbon containing compounds, urethanes and silicones. Silicone rubbers have excellent molding and extrusion properties and are used to form gaskets with good temperature resistance, resistance to compression set and tensile strength. In stationary sealing applications, silicone rubber gaskets perform well. However, silicone rubber inherently possesses a high coefficient of friction and thus in applications where one or both mating surfaces in contact with the gasket may move lateral to the surface of the gasket there is a tendency to tear. Silicone rubber formulations having good resistance to tear generally are not pliant enough to provide an effective seal in relatively low pressure applications such as automotive sunroofs. Therefore, in applications where lateral forces are generated on the gasket, silicones have not been the material of choice.

U.S. Pat. No. 4,223,897 discloses an anti-stick, non-liquid absorbing laminated gasket The laminated gasket comprises a metallic core and a bonded fibrous layer. The fibrous layer contains a liquid impermeable, resinous impregnate. An anti-stick coat lies along an outer face of the fibrous layer. The anti-stick coat is selected from a group consisting of polytetrafluoroethylene, silicones, polysiloxanes talc, and bentonite. The gaskets are used to seal stationary mating surfaces against fluid leaks in conduits for steam or air, and automotive parts such as carburetors, manifolds and cylinder heads.

U.S. Pat. No. 5,368,315 discloses a non-stick automotive gasket which comprises a resilient material having a polymeric fluorocarbon coating obtained by impregnating the resilient material with a saturant having dispersed therein polymeric fluorocarbon particles. The non-stick gaskets of the patent are used to seal stationary mating surfaces.

U.S. Pat. No. 5,468,815 discloses a curable silicone release formulation for preparing a laminate of a substrate and adhesive. In this application the user typically applies one face of the adhesive to a surface with a release liner in place on the second exposed adhesive surface. The applicator then applies pressure to the release liner to secure the adhesive to the surface. In applying pressure to the release liner, a user often encounters resistance due to friction. The cured coating of the patent is said to reduce the coefficient of friction in this instance.

U.S. Pat. No. 5,080,973 discloses a low friction, high adhesion release coating for disposable diaper tape based on at least 15% by weight of a reactive polydialkylsiloxane, preferably a reactive dimethylsiloxane, at least 40% by weight of a reactive silicone high adhesion agent and crosslinking agent. The composition contains a suitable noble metal catalyst and is heat cured.

None of the above patents disclose a method of lowering the coefficient of friction of a gasket by coating the gasket with a composition containing a curable silicone resin and a lubricating filler which is not soluble in the coating properties.

SUMMARY OF THE INVENTION

In the present invention, the coefficient of friction is lowered by applying a coating containing a curable silicone resin mixed with at least one lubricating filler which is not soluble in the coating to the gasket and curing the resin on the surface of the gasket. Gaskets treated in this manner, exhibit a marked reduction in surface coefficient of friction. The lubricating filler is maintained in place on the surface of the gasket by the resin thus prolonging the friction reducing effects. Because of the reduced coefficient of friction silicone rubber gaskets exhibit improved resistance to tear.

DESCRIPTION OF THE INVENTION

The present invention relates to gaskets coated with a curable silicone resin mixed with at least one lubricating filler. Gaskets treated in this manner exhibit reduced coefficient of friction and are less susceptible to tearing due to lateral or sliding motion of a mating surface against the surface of the gasket.

According to the present invention, the curable silicone coating composition comprises:

A. a curable silicone resin

B. a catalyst

C. at least one lubricating filler not soluble in the coating composition and

D. optionally a solvent.

The components may be combined in any manner with mixing which assures that the lubricating filler will be distributed uniformly throughout the coating composition. In a preferred embodiment the silicone resin and catalyst, and lubricating filler and solvent are mixed separately then combined with constant stirring. The composition is then applied to a gasket in any known manner such as dipping, rolling, brushing, spraying, etc. and cured at elevated temperatures.

The gaskets which are coated according to the present invention may be composed of any elastomeric resilient materials which are known to those skilled in the art. These materials include for example, natural or organic and synthetic rubbers such as EDPM, SBR, butyl, nitrile and neoprene, chlorosulfonated polyethylene, fluorocarbon containing compounds, urethanes and silicones. Silicone rubbers are preferred, particularly the so-called heat curable rubbers, because of their high mechanical strength, low compression set and resistance to temperature and weathering. In general heat curable silicone rubber formulations consist of polydimethylsiloxanes with reactive vinyl groups, surface modified finely dispersed silica, a suitable crosslinker and a catalyst. Additional components may include added fillers, hot air stabilizers, flame retardant materials or pigments. As a rule these rubbers are vulcanized with the aid of various peroxides. The gaskets are formed by known methods such as compression molding or extrusion.

The curable silicone resin of the present invention are those resins known in the art. Silicone resins are highly cross-linked high molecular weight siloxane systems and are thus available as powders or flakes or as solutions in organic solvents. In general curable silicone resins employed in the present invention are represented by the formula $$R_aSiO_{4-a/2} \qquad (I)$$

where the substituent R represents an organic substituent, hydrogen or hydroxyl group, the organic constituent itself may be functional. Examples of an organofunctional would be an alkoxy group, alkenyl group or alkynyl group. The variable "a" is not greater than three.

Examples of R in the above formula as an organic constituent are optionally substituted monovalent hydrocarbon radicals having from 1 to 18 carbon atoms. Examples of monovalent hydrocarbon radicals represents by R are alkyl radicals, such as the methyl, ethyl, n-propyl, isopropyl, 1-n-butyl, 2-n-butyl, isobutyl, tert-butyl, n-pentyl, isopentyl, neo-pentyl and tert-pentyl radicals; hexyl radicals such as the n-hexyl radicals; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl and cycloheptyl radicals and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the $\alpha$- and $\beta$-phenylethyl radicals.

Examples of substituted monovalent hydrocarbon radicals represented by R having from 1 to 18 carbon atoms are halogenated radicals such as haloalkyl radicals, for example the 3,3,3-trifluoro-n-propyl radical, the 2,2,2,2',2',2',-hexafluoroisopropyl radical and the heptafluoroisopropyl radical, and haloaryl radicals, such as the o-, m- and p-chlorophenyl radicals.

Examples of preferred monovalent hydrocarbon radicals represented by R are alkyl radicals having from 1 to 4 carbon atoms such as the methyl, ethyl, propyl and butyl radicals.

It is preferred that at least 80% and more preferably at least 90% of the R substituents are methyl radicals.

R may also represent an organo functional group. Examples of organic substituents which are functional are alkoxy groups having from 1 to 10 carbon atoms, such as methoxy, ethoxy, n-propoxy, isopropoxy, butoxy, hexyloxy, heptyloxy, octyloxy, vinyloxy, allyloxy, ethyallyloxy, isopropenyloxy, butadienyloxy, phenoloxy and methoxyethyleneoxy groups, nitrogen containing organic groups such as dimethylaminoxy, diethylaminoxy, dibutylaminoxy, dioctylaminoxy, diclohexylaminoxy, diphenylaminoxy, ethylmethylaminoxy, methylphenylaminoxy, n-butylamino, sec-butylamino, cyclohexylamino, benzoylmethylamino, acetaldoxime, acetophenoxime, acetonoxime, benzophenoxime, diisopropylketoxime and chlorocyclohexanonoxime; acyloxy groups such as acetoxy, propionyloxy, valeroxy, caproyloxy, myrisloyloxy, stearyloyloxy; and unsaturated hydrocarbons having from 1 to 10 carbon atoms such as vinyl, allyl and hexyl, alkoxy groups such as methoxy and propoxy are preferred. The silicone resins used in the invention are prepared by methods known in the art.

The catalyst used in the present invention is determined by the type of silicone resin. In general any catalyst may be used which is known in the art to be effective for a particular resin. For example, silanol and alkoxy containing resins utilize known condensation catalysts such as zinc octoate, lead and cobalt naphthnate, butyltitanate, aluminum salts of carboxylic acids, such as aluminum acetylacetonate and polysiloxanes containing acyloxy groups. Vinyl and hydrogen containing resins utilize known hydrosilation catalysts such as platinum metal/olefin complexes. Examples of useful hydrosilation catalysts include chloroplatinic acid, platinum deposited on a substrate, platinum complexed with alcohols, aldehydes and vinylsiloxanes and complexes of rhodium halides. Peroxides can be used as catalysts to affect additional cure in resins containing vinyl groups.

The lubricating filler or combination of fillers of the present invention are dry, fine particulate solid materials. The materials are insoluble in the curable silicone composition. Many of the materials can be characterized as layer-lattice solids where bonding between atoms in an individual layer is by strong covalent or ionic forces and those between layers are relatively weak van der Waal's forces an example of which is molybdendium disulfide ($MoS_2$) and graphite. However, materials without the layer-lattice structure such as talc and calcium bentonite are also used. Examples of suitable lubricating fillers include molybdenum disulfide, tetrafluoroethylene (Teflon®), polytetrafluoroethylene (PTFE), fluoroethylene-propylene copolymer (FEP), graphite, mica, niobium diselenide, tungsten disulfide, tungsten diselinide, talc and treated talcs. The lubricating fillers may be used alone or in combination. An example of a preferred combination is a 1:1 mixture of TEFZEL® HT2000, a tetrafluoroethylene-ethylene copolymer available from DuPont and a talc treated at elevated temperatures with hydroxyl terminated siloxanes in a weight to weight ratio of 25:1, talc:siloxane.

The solvent chosen depends on the type of resin selected to coat the gasket. Any solvent may be used in which the silicone resin and preferably the catalyst are soluble. Satisfactory solvents include acetone, methylethyl ketone, ethylbutyl ketone, diacetone alcohol, benzene, perchloroethylene, mineral spirits, naphtha and the like.

Other additives may be present. Examples of other additives include corrosion inhibitors, oxidation inhibitors, heat stabilizers, and agents which improve the adhesion of the cured resin to the gasket.

In preparing the curable silicone composition used to coat a gasket substrate, the components can be mixed in any order. Preferably the components are mixed at room temperature although higher temperatures may be employed. In any event, when a solvent is used the composition must be stirred continuously to maintain the dispersion of the insoluble lubricating filler or mixture of fillers. The curable silicone composition should be used soon after adding the catalyst.

The curable silicone composition is applied to the gasket by brushing, dipping, or spraying. If the resin, catalyst and lubricant are mixed together without a solvent, the resulting dry mixture is applied by dusting the gasket substrate. After application, the coated gasket is cured at elevated temperatures. Curing times and temperatures vary with the type of resin, the type of catalyst and catalyst amount. In a preferred embodiment a resin consisting of an alkoxy functional methylpolysiloxane and aluminum acetylacetonate as a catalyst in a 97:3 weight ration as a 10% dispersion in mineral spirits was satisfactorily cured on a silicone rubber substrate in one hour at 175° C.

EXAMPLES

A ⅛" thick slab of a silicone rubber gasket material having a 60 durometer was prepared from ELASTOSIL® R401 rubber base. ELASTOSIL® R401 is commercially available from Wacker Silicones Corporation. The slab of gasket material was cut into 2"×1"×⅛" sleds and coated with the components indicated in Table 1. Static friction for each sled was measured by placing the sled on an enameled steel substrate attached to an inclined plane apparatus equipped with a means for smoothly increasing the inclination of the plane of the substrate on which the test sled rests and a means of measuring the angle of inclination. A similar apparatus is described in ASTM D4518. The measurement of static friction is the valve given in degrees of inclination from horizontal at which the silicone rubber sled begins to move on the enamelled steel substrate.

TABLE I

| Sled No. | Silicone Resin/Lubricating filler | Weight ratio | Degree of Inclination |
|---|---|---|---|
| 1 | Untreated/Untreated | | 72° |
| 2 | MK resin/Untreated | 100 | 49° |
| 3 | Untreated/treated talc | 100 | 54° |
| 4 | MK resin/TEFZEL ® HT2000 | 50:50 | 38° |
| 5 | Mk resin/HT2000/treated talc | 50:25:25 | 34° |
| 6 | MK resin/Molybdenum disulfide | 50:50 | 37° |
| 7 | MK resin/powdered graphite | 50:50 | 37° |

The components of sleds 2 and 4–7 were applied as 10 weight % dispersions in mineral spirits and baked at 175° C. for one hour. Sled 1 was untreated. Sled 3 was treated by dry dusting with a treated talc. The treated talc was prepared by mixing Talc Texas 4411, available from Whittaker Clark and Daniels, Inc., with a hyroxyl terminated siloxane having approximately 4 mole % OH groups at about 100° C. for from 2 to 6 hours. The MK resin used in sleds 2 and 4–7 is a 97:3 weight ratio of an alkoxy functional methylpolysiloxane and aluminum acetylacetonate used as a catalyst. Sled 1 was a control and illustrates the relative high coefficient of friction of silicone rubber. Movement of sled 1 was detected only after the substrate was raised 72° from horizontal. Sleds 2 and 3 treated with a curable resin and a lubricating filler respectively show some reduction of the coefficient of friction. Sleds 4–7 coated with a curable composition according to the invention containing both a curable resin and a lubricating filler significantly reduced the coefficient of friction of the silicone rubber gasket material over sleds with either the curable silicone or a lubricating filler.

What is claimed is:

1. A method for reducing the coefficient of friction of a gasket subject to lateral forces, comprising;

A. applying to said gasket a curable silicone coating composition comprising,
   i a curable silicone resin
   ii a catalyst
   iii at least one lubricating filler not soluble in the coating composition, and
   iv optionally a solvent and B. curing the silicone coating composition.

2. A method as claimed in claim 1, wherein the curable silicone resin is an alkoxy functional methylpolysiloxane.

3. A method as claimed in claim 1, where the lubricating filler is a tetrafluoroethylene-ethylene copolymer, talc, tetrafluoroethylene, molybdenum disulfide or graphite.

4. A method as claimed in claim 1, where the lubricating filler is a mixture of a tetrafluoroethylene-ethylene copolymer and a talc treated with a hyroxyl terminated siloxane.

5. A method as claimed in claim 1, wherein the talc is treated with a hydroxyl terminated siloxane.

6. A method as claimed in claim 1, where the gasket is a silicone rubber.

7. A method for reducing the coefficient of friction of a gasket subject to lateral forces comprising;

A. applying to the gasket a curable silicone coating composition comprising; a 10 weight percent dispersion in mineral oil of a 50:25:25 weight ratio of
   i a 97:3 weight ratio of an alkoxy functional methylpolysiloxane and aluminum acetylacetonate,
   ii a tetrafluoroethylene-ethylene copolymer, and
   iii a talc treated at elevated temperatures with a hydroxyl terminated siloxane in a 25:1 talc to siloxane weight ratio, and B. curing the composition applied to the gasket.

* * * * *